United States Patent
Jostschulte (10) Patent No.: US 6,847,739 B2
(45) Date of Patent: Jan. 25, 2005

(54) METHOD FOR PROCESSING COMPRESSED IMAGE DATA FOR REDUCING BLOCKING ARTIFACTS

(75) Inventor: Klaus Jostschulte, Dortmund (DE)

(73) Assignee: Sony International (Europe) GmbH, Berlin (DE)

( * ) Notice: Subject to any disclaimer, the term of this patent is extended or adjusted under 35 U.S.C. 154(b) by 562 days.

(21) Appl. No.: 09/882,384

(22) Filed: Jun. 15, 2001

(65) Prior Publication Data

US 2002/0015535 A1 Feb. 7, 2002

(30) Foreign Application Priority Data

Jun. 16, 2000 (EP) .............................. 00112793

(51) Int. Cl.[7] .............................. G06K 9/40; H04N 1/38; H04N 7/12
(52) U.S. Cl. .................. 382/268; 382/262; 358/463; 375/240.29
(58) Field of Search .................. 382/261, 268, 382/254, 232, 260, 264, 275, 266, 250; 358/463; 348/420.1, 421.1; 375/240.24, 240.27, 240.29

(56) References Cited

U.S. PATENT DOCUMENTS

| | | | | |
|---|---|---|---|---|
| 4,941,043 A | * | 7/1990 | Jass | 375/240.2 |
| 5,473,384 A | * | 12/1995 | Jayant et al. | 348/470 |
| 5,561,695 A | | 10/1996 | Hu | 378/8 |
| 5,654,759 A | * | 8/1997 | Augenbraun et al. | 375/240.03 |
| 5,696,851 A | * | 12/1997 | Rao | 382/266 |
| 5,850,294 A | * | 12/1998 | Apostolopoulos et al. | 358/426.14 |
| 5,881,180 A | | 3/1999 | Chang et al. | 382/268 |
| 5,933,542 A | | 8/1999 | Chang et al. | 382/264 |
| 5,974,197 A | * | 10/1999 | Lee et al. | 382/268 |
| 6,108,455 A | * | 8/2000 | Mancuso | 382/261 |
| 6,192,079 B1 | * | 2/2001 | Sharma et al. | 375/240.16 |
| 6,240,135 B1 | * | 5/2001 | Kim | 375/240.01 |

OTHER PUBLICATIONS

Rabiee H R et al: "Image De–Blocking with Wavelet–Based Multiresolution Analysis and Spatially Variant OS Filters" Proceedings of the International Conference on Image Processing, US, Los Alamitos, CA: IEEE, Oct. 26, 1997, pp. 318–321, XP000792775.

* cited by examiner

*Primary Examiner*—Kanji Patel
(74) *Attorney, Agent, or Firm*—Frommer Lawrence & Haug LLP; William S. Frommer (57) ABSTRACT

A method for post-processing compressed image data for reducing blocking artifacts is suggested, in which a set of primary image data (PID) is decomposed into data sets (IID1, IID2) containing the fine structure of the image with structure being smaller than the blocking artifacts and without the blocking artifacts and structures being larger than or comparable to the blocking artifacts as well as the blocking artifacts, respectively. In the decomposition of the primary image data (PID) a non-linear filtering process (F1) is involved. After decomposition of the primary image data (PID) a filtering process (F3) can be applied to the set of intermediate image data (IID2) containing larger details of the image as well as the blocking artifacts. Therefore, in the process of filtering out the blocking artifacts, the fine structure of the image is not influenced.

9 Claims, 6 Drawing Sheets

METHOD FOR PROCESSING COMPRESSED IMAGE DATA FOR REDUCING BLOCKING ARTIFACTS

BACKGROUND OF THE INVENTION

The invention relates to a method for processing compressed image data for reducing blocking artefacts.

Modern methods of video communication and image data exchange use encoding methods to reduce the transfer and/or storage bandwidth usually necessary when storing and/or transferring image data digitally. Therefore, a variety of image data encoding methods has been developed. In typical encoding methods—such as processors called JPEG, MPEG or the like—it is common to decompose the images or frames to be stored or transferred into small sized blocks. After dividing the images or frames into blocks, an encoding transformation is applied to the blocks. For example, the discrete cosine transformation (DCT) may be used. As a result of the encoding transformation instead of a distinct number of pixels an equivalent number of transformation coefficients is obtained. The set of coefficients for each block is then quantized so as to reduce the amount of information describing the distinct blocks.

Generally, a certain amount of image information is lost during the process of quantization and thereby so-called blocking artefacts are generated after reconstruction of the digitized image by applying the inverse encoding transformation to the set of quantized transformation coefficients to reconstruct the encoded image. These blocking artefacts appear in the region of the boundaries of adjacent image blocks as discontinuities of brightness, contrast and/or colour.

To reduce the amount of loss of significant information and the effect of the blocking artefacts, a variety of different algorithms and methods has been suggested.

The method according to EP-0 526 885 A2 uses lowpass filtering and is an efficient method to reduce blocking artefacts. However, the suggested method is built up as a part of the decoder and therefore, specific information with respect to the encoding/decoding process is necessary.

U.S. Pat. No. 5,774,597 discloses a method for image compression and decompression using overlapping cosine transforms. The method suggests to remove blocking artefacts from a compressed and restored digitized image by modifying the particular coding process. Furtheron, the corresponding decoder has to invert the pre-processing step.

EP 0 771 507 B1 suggests a method and an apparatus for reducing image data compression noise. According to the suggested method both, the encoding and the decoding processes are modified. Additionally, the suggested method needs further information with respect to the coded data stream to reduce blocking artefacts.

Most prior art methods for reducing blocking artefacts have in common that they need to modify the coding and/or the encoding process. Therefore, the known methods are not applicable as pure post-processing methods to already coded data material.

SUMMARY OF THE INVENTION

It is an object of the present invention to provide a method for processing compressed image data for reducing blocking artefacts which is capable of reducing blocking artefacts in compressed image data in a purely post-processing step, without particular knowledge of the encoding/decoding process used during compression and with particular low degradation of image details.

The object is achieved by a method for processing compressed image data for reducing blocking artefacts with the characterizing features of claim 1. Preferred embodiments of the inventive method are within the scope of the dependent subclaims.

In accordance with the inventive method at least a first and a second set of intermediate image data are derived from a received set of primary image data which contain blocking artefacts. The first set of intermediate image data substantially contains details of said set of primary image data which are smaller than said blocking artefacts. The second set of intermediate image data substantially contains details of said set of primary image data which are not smaller than said blocking artefacts. Therefore, image details being smaller than said blocking artefacts are separated from image details being not smaller than said blocking artefacts. The inventive method also includes a step of applying a filtering process at least to said second set of intermediate image data so as to substantially reduce the amplitude of signals representing said blocking artefacts and thereby yielding a modified second set of intermediate image data. Finally, at least said first set of intermediate image data and said modified second set of intermediate image data are superimposed, thereby yielding a set of post-processed image data containing blocking artefacts at most in a reduced form. According to the invention the step of deriving said sets of intermediate image data involves at least a first non-linear filtering process.

It is a basic idea of the present invention to separate the fine structure of the image data being smaller than the blocking artefacts and to apply a distinct filtering process to reduce the amplitude and/or effect of the blocking artefacts to the data not containing the fine structure of the image. Therefore, according to the invention, the effect of the blocking artefacts can be reduced without blurring the images fine structure, in direct contrast to prior art methods for reducing blocking artefacts.

Another basic idea of the present invention is to use a non-linear filtering process in the step of decomposing the set of primary image data into the set of intermediate image data, the one of which describing the images fine structure and the other of which containing image details being larger than or comparable to the blocking artefacts as well as the blocking artefacts. In contrast to several prior art methods which employ linear filters non-linear filters have the advantage of being invariant with respect to edges in the image signal. Therefore, it is possible to keep the images' fine structure and blocking artefacts completely separated from each other in different sets of intermediate image data or signal subbands. Linear filters would generate contributions of an edge or blocking artefact in all subbands—in high and low frequency components—making impossible a strict separation from the images details.

According to a preferred embodiment of the inventive method said first set of intermediate image data is derived by subtracting from said set of primary image data the set of primary image data to which at least a first non-linear filtering process has been applied before subtraction. According to this measure the first set of intermediate image data includes only information with respect to the fine structure of the image, because larger details or details comparable in size to the blocking artefacts are subtracted during the deriving process.

A particular advantageous embodiment of the inventive method is characterized in that said second set of intermediate image data is derived by subtracting from said set of primary image data—to which at least said first non-linear filtering process has been applied before—a third set of intermediate image data containing neither blocking artefacts nor the image fine structure. Therefore, the derived second set of intermediate image data according to the invention substantially contains only the blocking artefacts as well as larger scaled details of the primary image data.

In a further preferred embodiment of the inventive method there is derived a third set of intermediate image data by applying to said set of primary image data at least a linear filtering process. Therefore, the so constructed third set of intermediate image data neither contains the fine structure nor the blocking artefacts of the primary image data.

It is of particular advantage to apply a non-linear filtering process to the set of primary image data before the application of the linear filtering process in the step of deriving said third set of intermediate image data. According to that measure the two-stage filtering process is accomplished with a linear filtering process following a non-linear filtering process.

It is of further advantage to use non-linear filtering processes which are substantially identical or the same.

In particular, the non-linear filtering processes involved may be median type filters or the like, in particular with an extension of about 15 coefficients or an extension which is adequate or selected in accordance to the amplitude and/or the size of the structure of the blocking artefacts.

In a further preferred embodiment of the inventive method in the step of deriving said modified second set of intermediate image data the applied filtering process involves at least a non-linear filtering step, in particular based on a non-linear characteristic curve with or without a constant signal reduction. It is the goal of the non-linear characteristic curve to cut off and/or reduce the amplitude and/or effect of the blocking artefacts by a substantial amount and in particular substantially without influencing other image details or structures.

According to a further preferred embodiment of the inventive method the coefficients of the applied filtering processes or steps and/or of the characteristic non-linear curve are selected in accordance with the size and/or the amplitude of the blocking artefacts. Therefore, the method can automatically be adjusted so as to yield an artefact reduction as good as possible. For instance, in the known JPEG- or MPEG-algorithm blocksizes of 8×8 pixels are used leading to a comparable size of the blocking artefacts.

In contrast to the known prior art methods of processing already encoded and compressed image data, the method according to the invention does not blur the image and/or destroy the images fine structure. Furtheron, in contrast to other known methods only a part of the image data or the image signal is subjected to a filtering process. Therefore, before applying a blocking artefacts reducing method a certain signal separation is carried out, which separates the fine structure and the details being smaller than the blocking artefacts substantially completely from larger objects, in particular larger than or comparable to the size of the blocking artefacts as well as the blocking artefacts. Therefore, the blocking artefacts usually remain within the path of the larger objects and no filtering process is applied to the fine structure and the smaller details of the image data. Therefore, the fine structures and the details smaller than the artefacts are not blurred and therefore preserved to yield a high image quality under reduction of the artefacts effect on the image.

To reduce the artefacts the difference between the signal containing the blocking artefacts and a blurred version having a low amplitude for the blocking artefacts and a high amplitude in the case of significant image objects is generated. Therefore, the reduction of the effect of the blocking artefacts can be performed by applying a non-linear characteristic curve filtering process.

The filtering coefficients can be chosen or selected in accordance to the size and/or the amplitude of the blocking effects. Additionally, the parameters of the non-linear characteristic curve are also dependent on the strength and the size of the artefacts.

It is a major advantage of the inventive method over prior art methods that it does not necessarily need information about the location of the blocks nor information about the quantization factors or detailed information about the underlying encoding or decoding processes except for the block size used for compression/decompression. Therefore, the inventive method can advantageously be applied independently from the particular method for compressing the image data.

On the other hand, it is of course possible to include such a priori information about the quantization factors, about the compressing method or the like so as to further increase the quality of reducing the effect of the blocking artefacts to the image data.

The inventive method is majority based on the application of a non-linear filter bank for separating blocking artefacts and/or image details from the primary image data. Furtheron, a further aspect of the inventive method is the reduction of blocking artefacts by processing the sub-bands of the image or the image signal as sets of intermediate image data and by using non-linear characteristic curves.

BRIEF DESCRIPTION OF THE DRAWINGS

The inventive method is further elucidated on the basis of preferred embodiments of the inventive method taking reference to the attached schematical drawings, in which.

DETAILED DESCRIPTION OF THE INVENTION

Figure 1:
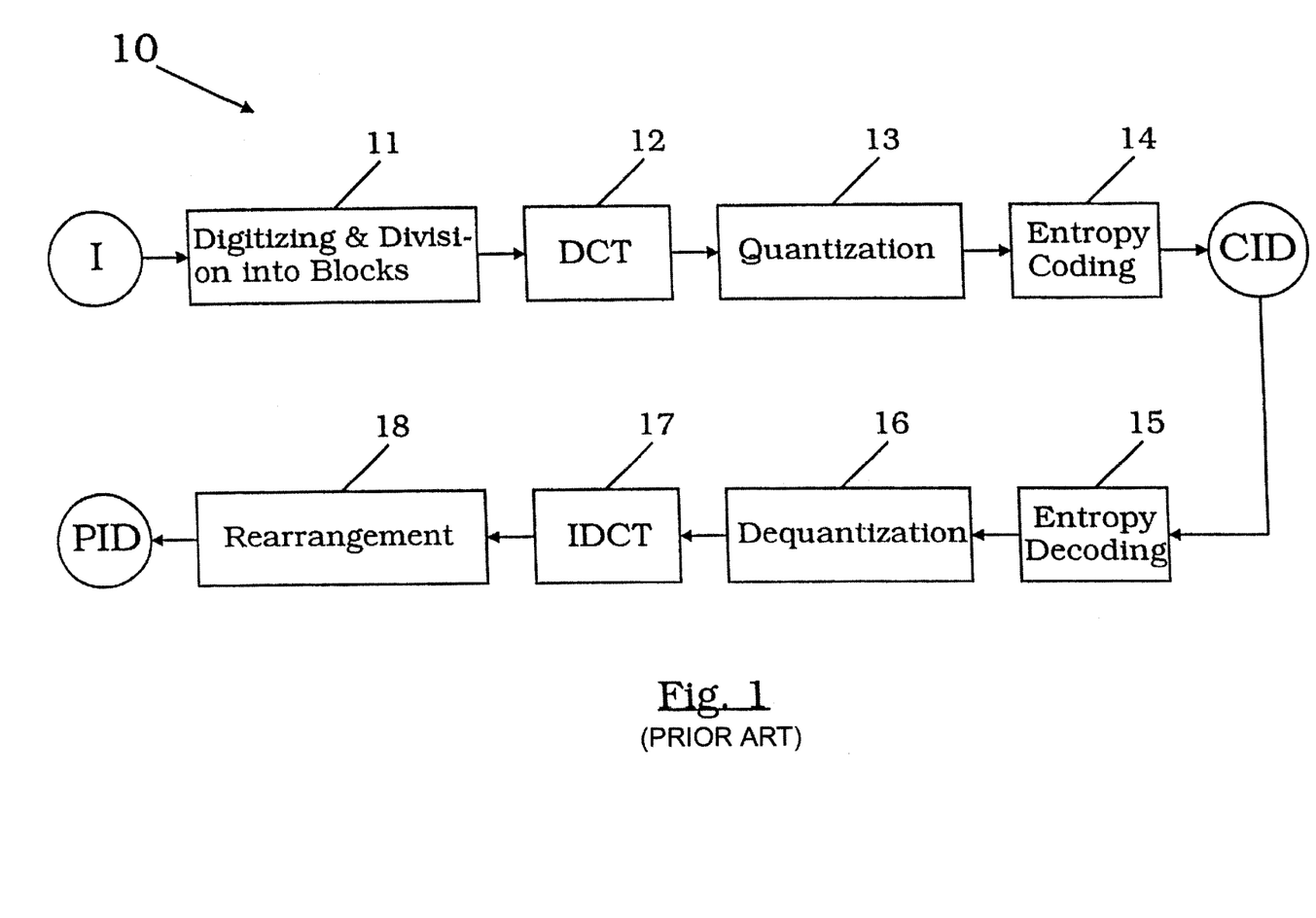
FIG. 1 is a block diagram showing a conventional transformation encoding process.

FIG. 1 shows by means of a schematical block diagram a conventional process 10 for a transformation encoding and decoding of an image I to yield a set of primary image data PID.

An incoming image I is digitized and subdivided into blocks in a first step 11. Each of the blocks is then further processed by for example a discrete cosine transformation DCT in step 12. Furtheron, the obtained coefficients for the blocks are quantized in step 13 and afterwards they are further processed by for instance an entropic encoding process in step 14. As an intermediate output a set of compressed image data CID comprising a compressed version of the image I is obtained.

From the set of compressed image data CID a decompressed image is generated as a set of primary image data PID by applying first an entropy decoding in step 15, a dequantization process in step 16 followed by the inverse IDCT of the discrete cosine transformation DCT of step 12 in step 17. Rearrangement of the data in step 18 yields the set of primary image data PID to be post-processed.

Figure 2:
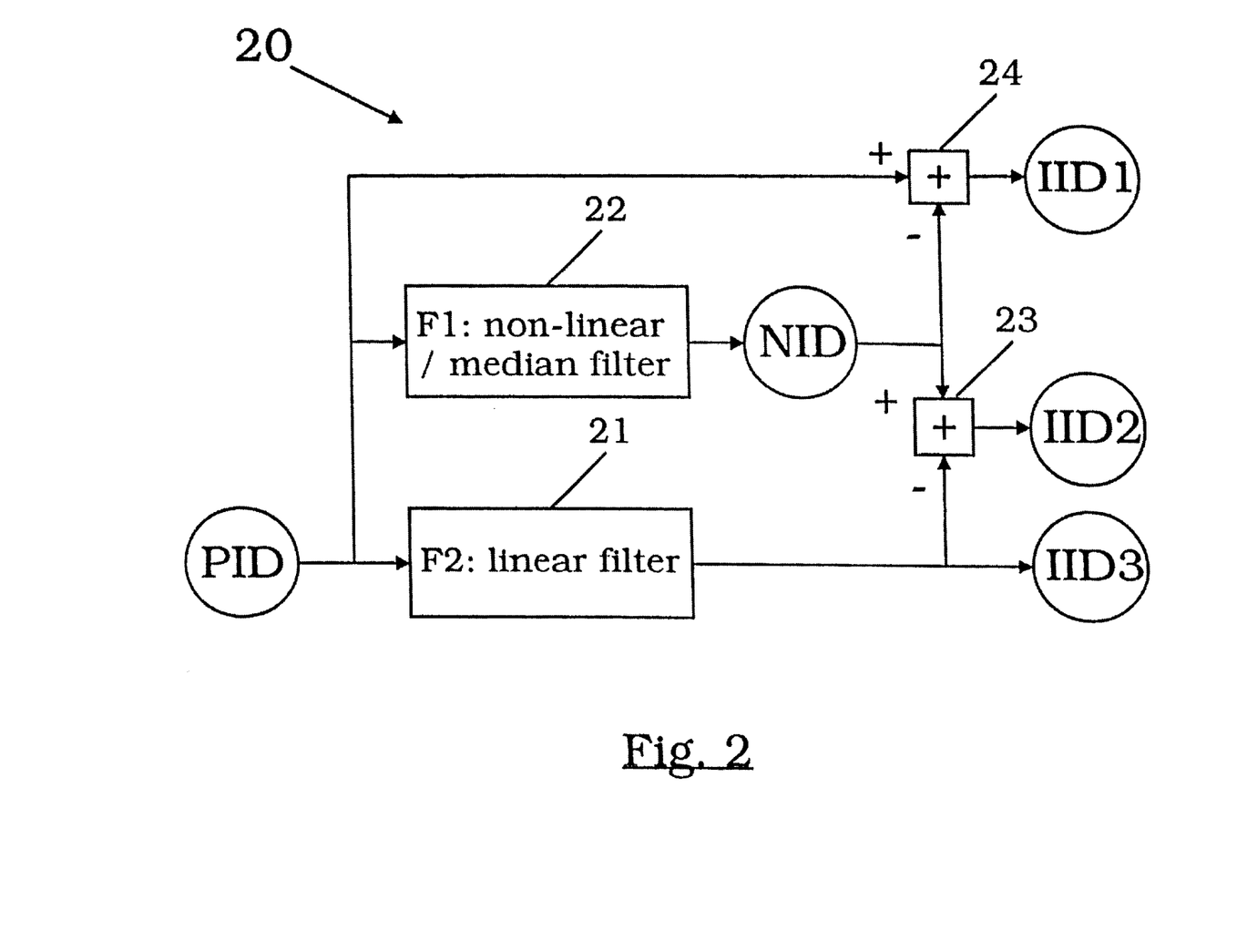
FIG. 2 is a block diagram showing a first section of an embodiment of the inventive method.

FIG. 2 shows by means of a schematical block diagram a first section 20 of an embodiment of the inventive method. For this first section 20 of the inventive method a set of primary image data PID is necessary as an input. As a result, the first section 20 of the inventive method produces first, second and third sets of intermediate image data IID1, IID2 and IID3, respectively.

The third set of intermediate image data IID3 is obtained by applying a linear filtering process F2 in the filtering step 21 to the set of primary image data PID.

In step 22 of the first section 20 of the inventive method a non-linear filter F1, in particular a median filter, is applied to the set of primary image data PID so as to obtain a set of non-linearly filtered image data NID as an intermediate product.

To obtain the first set of intermediate image data IID1, the set of non-linearly filtered image data NID is subtracted from the set of primary image data PID in step 24.

To obtain the second set of intermediate image data IID2, the third set of intermediate image data IID3 is subtracted from the set of non-linearly filtered image data NID in step 23 of the first section 20 of the inventive method.

The first section 20 of the inventive method according to FIG. 2 is built up as a single stage separation filter, since the linear filter F2 and the median filter F1 are applied to the set of primary image data PID independently from each other so as to obtain the third set of intermediate image data IID3 and on the other hand a set of non-linearly filtered image data NID. Furtheron, it appears from FIG. 2 that the first set of intermediate image data IID1 substantially contains the images' fine structure, namely image details being smaller than the blocking artefacts. Furtheron, the second set of intermediate image data IID2 does not contain the images fine structure but contains image details larger than or comparable to the blocking artefacts and in particular the blocking artefacts itself as well as image details belonging to large objects, in particular the edges thereof. Finally, the third set of intermediate image data IID3 neither contains the images' fine structure nor the blocking artefacts at all but describes as a linear filtered image more or less details describing the grey value structure of the set of primary image data PID or the like.

Figure 3:
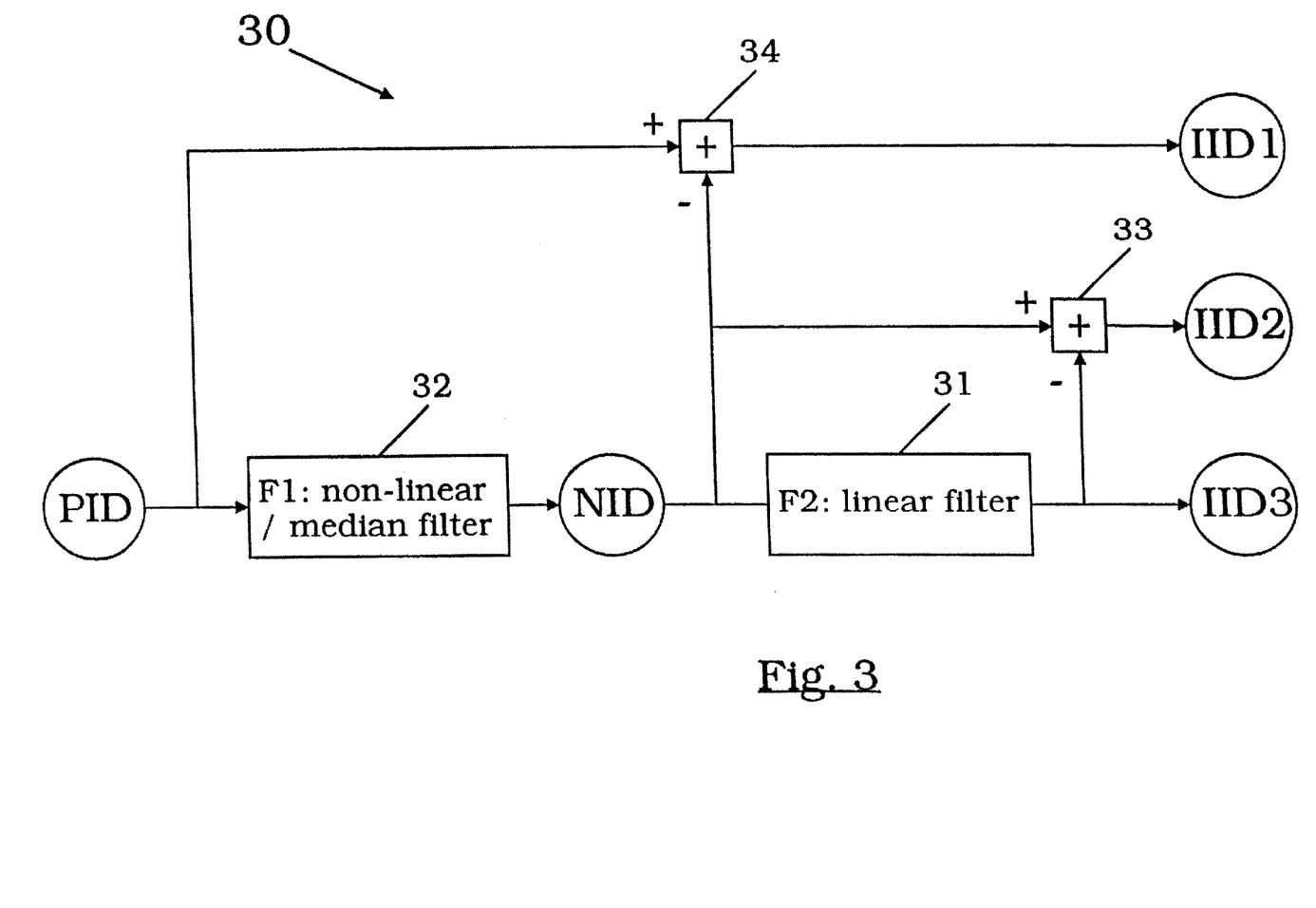
FIG. 3 is a block diagram showing a first section of another embodiment of the inventive method.

The schematical block diagram of FIG. 3 also shows a first section 30 of an embodiment of the inventive method and is comparable to that of FIG. 2 except that in the step of deriving the third set of intermediate image data IID3 from the set of primary image data PID a double-stage separation filter is applied which is in particular the composition of first non-linear median filter F1 applied in step 32 and yielding the set of non-linearly filtered image data NID and linear filter F2 which produces in step 31 in FIG. 3 the third set of intermediate image data IID3.

In step 34 the primary image data PID and the non-linearly filtered image data NID are subtracted from each other to obtain the first set of intermediate image data IID1. On the other hand, from the set of non-linearly filtered image data NID the third set of intermediate image data IID3 is subtracted so as to obtain a second set of intermediate image data IID2 in step 33 in FIG. 3.

Figure 4:
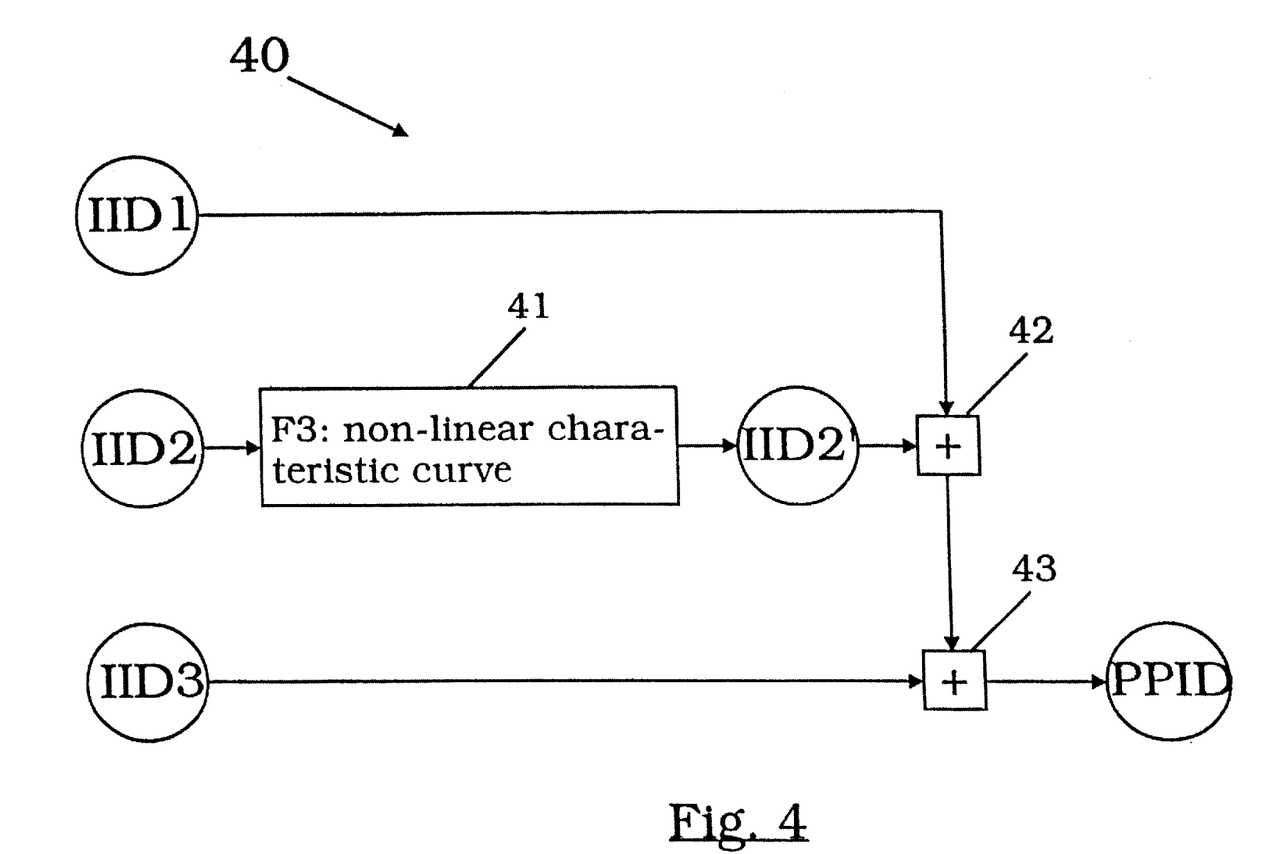
FIG. 4 is a block diagram showing a second section of an embodiment of the inventive method.

In the block diagram of FIG. 4 a second section 40 of an embodiment of the inventive method is shown.

To the second section 40 the first, second and third sets of intermediate image data IID1, IID2 and IID3 are supplied. After applying a non-linear filtering process based on a non-linear characteristic curve in step 41 to said second set of intermediate image data IID2 a modified second set of intermediate image data IID2' is obtained to which the first and the third sets of intermediate image data IID1 and IID3 are added in steps 42 and 43, respectively, so as to obtain a set of post-processed image data PPID containing reduced blocking artefacts.

Figure 5A:
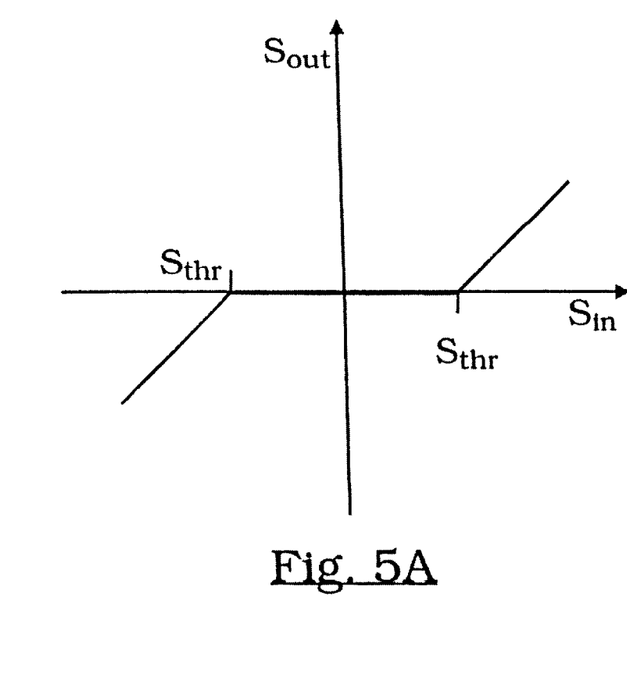
FIGS. 5A, 5B are graphical representations showing non-linear characteristic curves used in an embodiment of the inventive method.
Figure 5B:
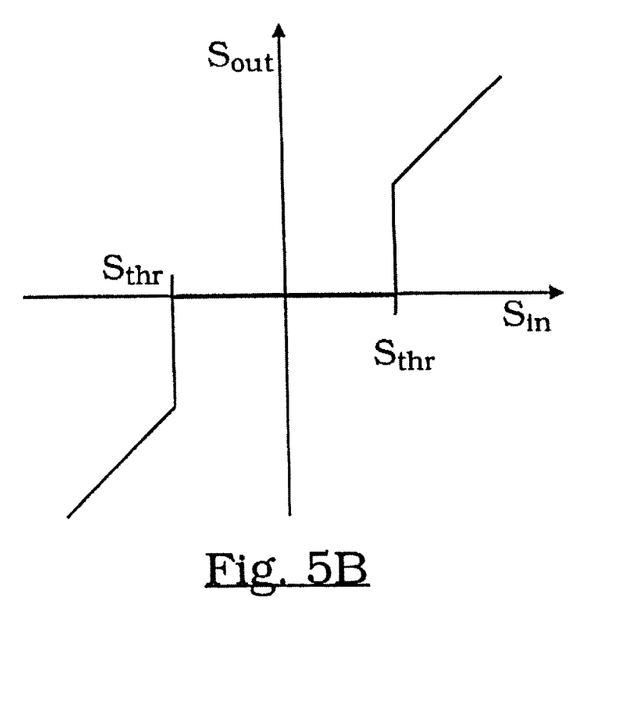

FIGS. 5A and 5B show by means of graphical representations non-linear input/output characteristics on which the non-linear filtering process F3 in step 41 of FIG. 4 is based on.

According to FIG. 5B input signals $S_{in}$ are set to zero unless they are larger than a certain pre-determined threshold $S_{thr}$ so as to transmit $S_{out}=S_{in}$ for $S_{in}>S_{thr}$ and 0 otherwise.

In contrast, a filter based on the curve of FIG. 5A additionally subtracts said threshold value $S_{thr}$ from signals above said threshold value $S_{thr}$ so as to transmit $S_{out}=S_{in}-S_{thr}$ for $S_{in}>S_{thr}$ and 0 otherwise.

Figure 6:
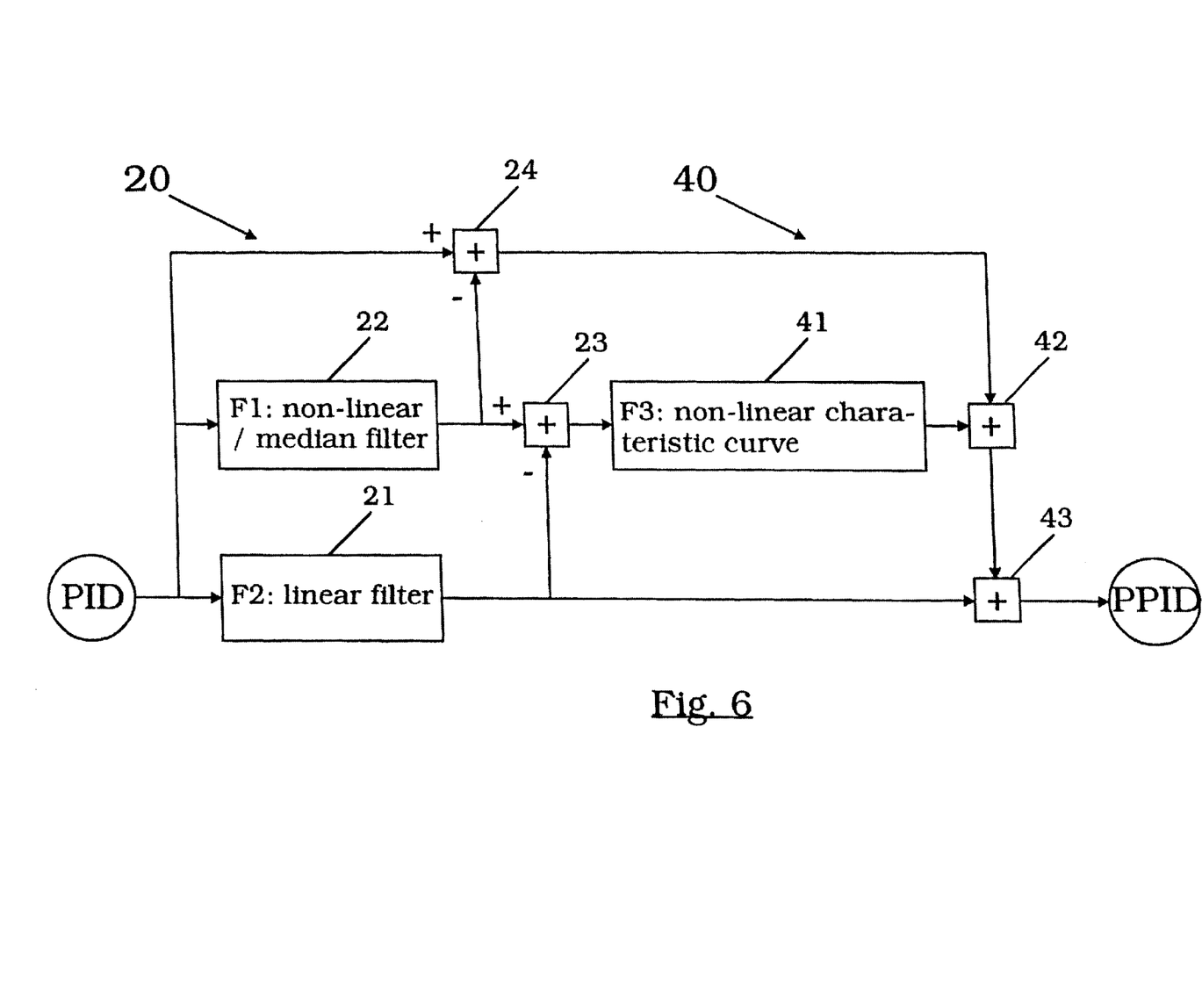
FIG. 6 is a block diagram showing a further embodiment of the inventive method.

FIG. 6 shows the composition of the first section 20 of FIG. 2 with the second section 40 of FIG. 4 to build a complete embodiment of the inventive method.

What is claimed is:

1. Method for processing compressed image data for reducing blocking artefacts, comprising the steps:

deriving from a received set of primary image data (PID) of an image containing blocking artefacts at least a first and second set of intermediate image data (IID1, IID2) the first (IID1) of which substantially containing details of said set of primary image data (PID) which are smaller than said blocking artefacts and the second (IID2) of which substantially containing details of said set of primary image data (PID) which are not smaller than said blocking artefacts, so as to separate image details being smaller than said blocking artefacts from image details being not smaller than said blocking artefacts, and applying a filtering process (F3) at least to said second set of intermediate image data (IID2), so as to substantially reduce the amplitude of signals representing said blocking artefacts, thereby yielding a modified second set of intermediate image data (IID2') and superimposing at least said first set of intermediate image data (IID1) and said modified second set of intermediate image data (IID2'), thereby yielding a set of post-processed image data (PPID) containing blocking artefacts at most in a reduced form, wherein at least the step of deriving said sets of intermediate image data (IID1, IID2) involves at least a first non-linear filtering process (F1).

2. Method according to claim 1, wherein said first set of intermediate image data (IID1) is derived by subtracting from said set of primary image data (PID) the set of primary image data (PID) to which at least the first non-linear filtering process (F1) has been applied before subtraction.

3. Method according to claim 1, wherein said second set of intermediate image data (IID2) is derived by subtracting from said set of primary image data (PID)—to which at least said first non-linear filtering process (F1) has been applied before—a third set of intermediate image data (IID3) containing neither blocking artefacts nor the image fine structure.

4. Method according to claim 3, wherein said third set of intermediate image data (IID3) is derived by applying to said set of primary image data (PID) at least a linear filtering process (F2).

5. Method according to claim 4, wherein in the step of deriving said third set of intermediate image data (IID3) prior to the application of the linear filtering process (F2) a non-linear filtering process (F1) is applied to the set of primary image data (PID).

6. Method according to claim 3, wherein the applied non-linear filtering process and the first non-linear filtering process (F1) are substantially the same.

7. Method according to claim 1, wherein the non-linear filtering processes (F1) are median filters or the like, in particular with an extension of about 15 coefficients.

8. Method according to claim 1, wherein in the step of deriving the modified second set of intermediate image data (IID2') the applied filtering process (F3) involves a non-linear filtering step, in particular based on a non-linear characteristic curve with or without a constant signal reduction.

9. Method according to claim 1, wherein the coefficients of the filtering processes and/or of the non-linear characteristic curve are—in particular automatically—selected in accordance to the size and/or the amplitude of the blocking artefacts.

* * * * *